May 28, 1957     J. L. KERSEY, JR., ET AL     2,793,603
MINE CARS
Filed Dec. 14, 1953     2 Sheets-Sheet 1
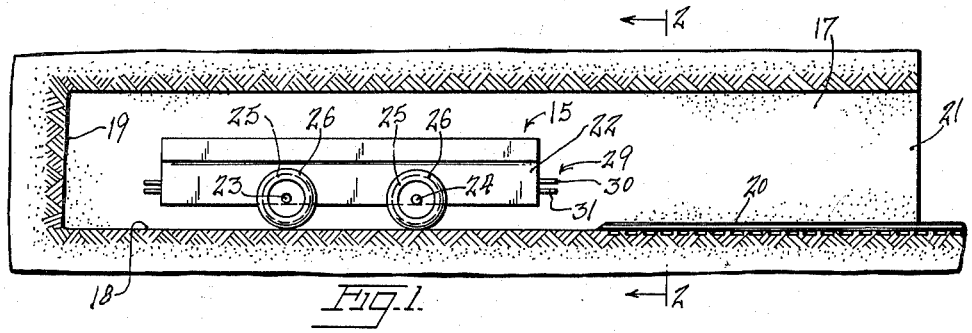
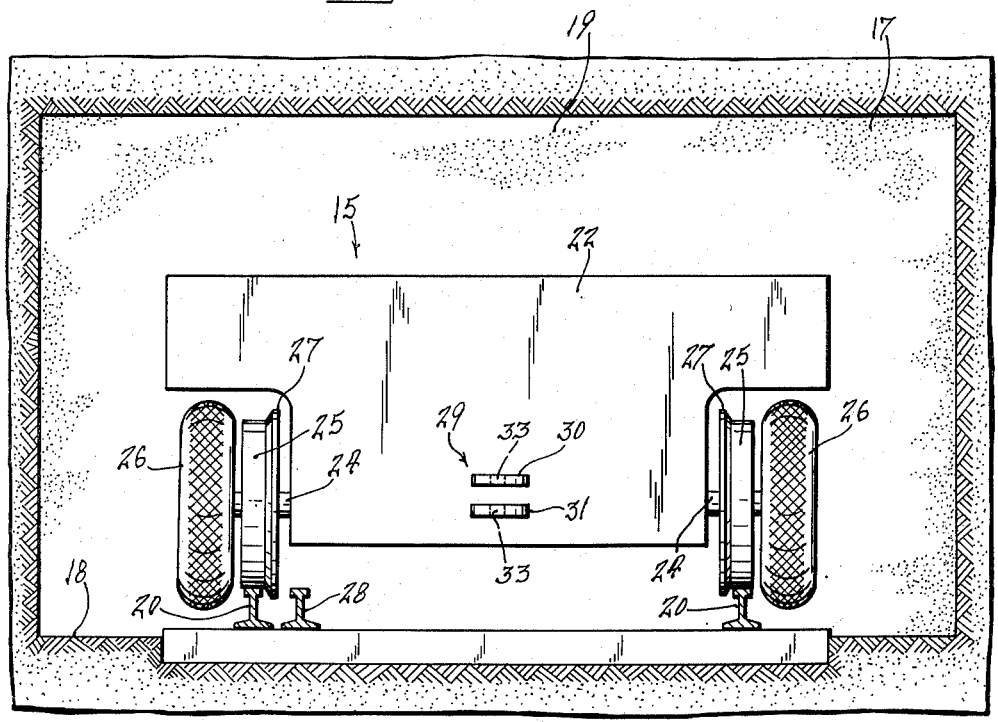
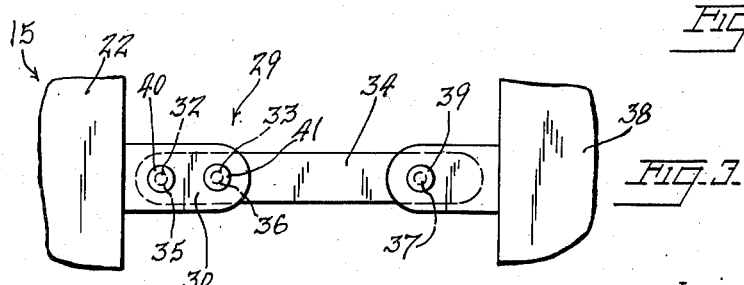
INVENTORS
JOHN L. KERSEY, JR.
BY FRANK N. KERSEY
ATTORNEY

INVENTORS
JOHN L. KERSEY, JR.
BY FRANK N. KERSEY

ATTORNEY

United States Patent Office

2,793,603
Patented May 28, 1957

2,793,603

MINE CARS

John L. Kersey, Jr., Bluefield, W. Va., and
Frank N. Kersey, Tazewell, Va.

Application December 14, 1953, Serial No. 397,908

1 Claim. (Cl. 116—34)

This invention relates to new and useful improvements in mine cars and mine car construction.

More particularly, the present invention proposes the construction of an improved mine car which can be used both as a rail vehicle for long haul work and main line hauling duty, and as a ground vehicle for short haul section gathering and transportation.

Another object of the present invention proposes forming the mine car with dual rail and inflatable rubber tire wheels mounted on the same axles to travel either on track or on a mine bottom at will for straight line transportation without transfer of coal and minerals from the producing point at the face to the ultimate destination outside the mine, said car being provided with means for indicating the state of inflation of the rubber tire wheels.

Still further, the present invention proposes constructing the mine car with flanged rail wheels for guidance between main and guide rails when moving the car from ground to rails.

As a further object, the present invention proposes arranging the rail and inflatable rubber tire wheels on the same axles with the diameter of the rubber tire wheels greater than that of the rail wheels to support the car solely when the rail wheels are not on rails, but not to touch the ground or road bed when the rail wheels are on rails, with an indicator device operatively disposed for rotation to indicate the rubber tire wheels are properly inflated.

The present invention further proposes a novel arrangement of a mine car having both rail wheels and rubber tire wheels and having a coupling for coupling to a tractor either rigidly or swivelly.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a sectional view of a mine tunnel with a track extending therein and a mine car therein constructed and arranged in accordance with the present invention.

Fig. 2 is a sectional view taken on line 2—2 of Fig. 1.

Fig. 3 is a top plan view of a portion of the mine car and of a tractor coupled thereto.

Figure 4:
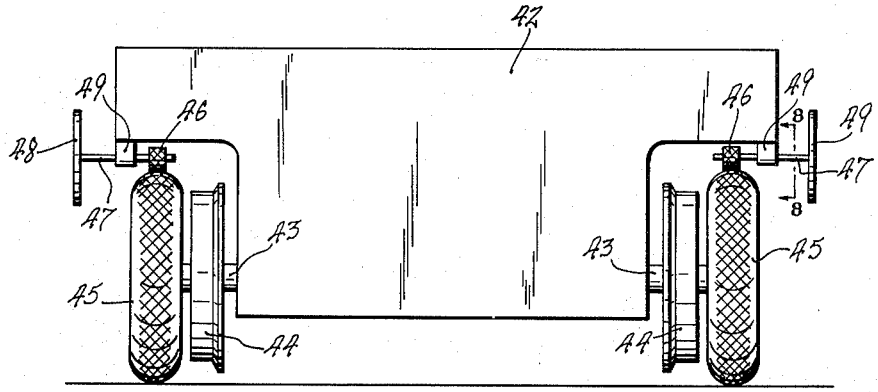
Fig. 4 is a view similar to Fig. 2 but illustrating a modification of the present invention.
Figures 5, 6:
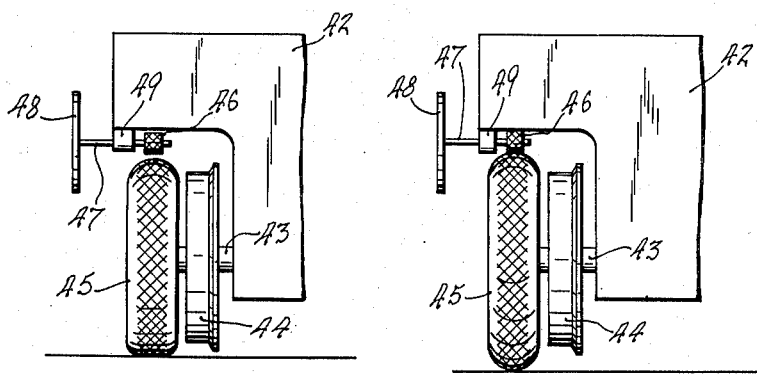
Figs. 5, 6 and 7 are fragmentary views of the structure shown in Fig. 4 but showing the tire underinflated, overloaded or overinflated, and the indicator device retracted, respectively.

Referring more particularly to the drawings, the mine car 15 is shown being used as a ground vehicle in a mine tunnel 17 on the ground or bottom 18 of the tunnel between the face 19 and the inner end of a track or rails 20 extending from outside the entrance 21 of the mine into the mine but terminating substantially short of face 19.

Mine car 15 has a chassis or body 22 on which is mounted axles 23 and 24. A pair of rail wheels 25 are rotatably mounted on each axle 23 and 24 and a pair of pneumatic rubber tire wheels 26 are also mounted on the axles 23 and 24 adjacent the rail wheels 25.

Rubber tire wheels 26 are of greater diameter than rail wheels 25 (see Fig. 2) to support the chassis solely when the rail wheels 25 are not on rails 20.

Rail wheels 25 are of a diameter solely to support the chassis 15 when they are on rails 20 with rubber tire wheels 26 raised above the ground or track bed. The rail wheels 25, as shown, are flanged with flanges 27 similar to flanged railroad wheels but of sufficient diameter to serve for guidance between main rails 20 and guide rail 28 when the car 15 is being transferred to the rails 20 or being switched from one set of tracks to another. The inner ends of rails 20 inside the mine should be tapered as shown in Fig. 1 to facilitate the transfer.

Rail wheels 25 may be disposed on the axles inboard or inside of the rubber tire wheels 26.

Rubber tire wheels 26 carry the weight of the car when it is travelling on the mine bottom or ground and rail wheels 25 support the car when on the rails. While four wheels are shown, it is apparent that the mine car may have any number. The combination of flanged rail wheels 25 and rubber tire wheels 26 shown is referred to as dual purpose wheels or dual wheels.

The relation between the diameters of the rubber tire wheels 26 and the rail wheels 25 is such that the rubber tire wheels 26 will deflect when crossing a rail without lifting a flanged rail wheel 25 above its flange 27.

Car 15 is provided with a tractor hitch or coupling 29 made in two spaced parts 30 and 31 and having two spaced pin holes 32 and 33 through each part. A rigid coupling bar 34 has similar holes 35 and 36 at one end and a pin hole 37 at the other end pivotally to secure it to a tractor 38 by a pin 39. Two coupling pins 40 and 41 removably mounted in coupling 29 extend through holes 32, 35 and 33, 36, respectively, removably to secure the bar 34 to the coupling 29. When tractor 38 is pushing the car 15, the second pin 41 may be kept in place stiffly and rigidly affixing the bar 34 to the coupling 29 so there is only one pivot point between the tractor 38 and car 15.

While the tunnel 17 is shown straight for simplicity, in the usual coal mine the main entries are provided with track or rail generally known as the main line to distinguish it from the producing sections commonly known as the gathering sections. It is expensive and inconvenient to use track haulage in the gathering sections because of the continuing advance of the coal face from which the coal is being withdrawn. A rubber tire vehicle can operate at an advantage in these gathering sections whereas rails and track prove more economical and satisfactory for main line hauling. The new car of this invention permits the advantages of both type vehicles to be utilized without the necessity of transferring from one to the other.

The Figs. 4 to 7, inclusive to show a chassis or mine car 42 having axles 43 mounted thereon (only one axle being shown) with flanged rail wheels 44 and pneumatic rubber tire wheels 45 thereon. Rotatably mounted on chassis 42 above each rubber tire wheel 45 is an idler wheel 46. The idler wheels 46 are each fixed to one end of a shaft 47 and an indicator disc 48 is fixed to the other end of each shaft 47. The shafts 47 are rotatably mounted in brackets 49 on the chassis 42. The shafts 47 pass through bores 47' which are oversize in the vertical direction in brackets 49 as shown in Fig. 8.

When the rubber tire wheels 45 are properly inflated and are supporting the proper load, the idler wheels 46 are just touching them and are rotated thereby. Thus the indicator discs are rotated as the idler wheels rotate (see Fig. 4). When the rubber tire wheels 45 are under inflated, they shrink slightly from their properly inflated condition and lose contact with the idler wheels 46 whose supporting shafts 47 rest on the bottoms of bores 47'. The indicator discs 48 will show this condition by their failure to rotate (see Fig. 5) when the wheels 45 rotate.

When the rubber tire wheels are overinflated or overloaded, they will bear against the idler wheels 46 enough to cause shafts 47 to rise in bores 47' and jam the idler wheels 46 against the underside of chassis 42 to prevent their rotation. The failure of the indicator discs 48 to rotate will show this over inflated condition (see Fig. 6).

By the indications of under inflation or over inflation obtained before the car is put into use on the main rail line the operator is warned and can then properly inflate the rubber tire wheels. In this manner the flanged rail wheels 44 are protected so that the flanges will not be injured by inadvertent ground running on underinflated rubber tire wheels. Also over inflation of the rubber tire wheels crossing over the rails is prevented, when the rail wheels 44 are supporting the car in main line operation.

Figure 7:
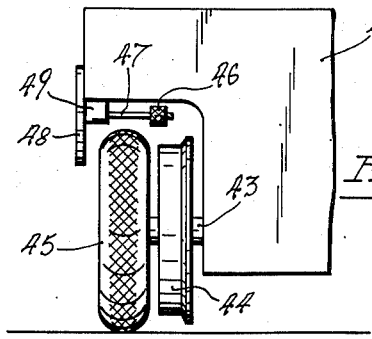
Figure 8:
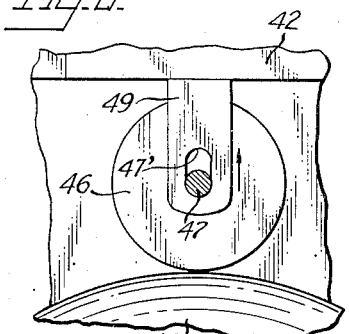
Fig. 8 is a sectional view taken on line 8—8 of Fig. 4 and showing on an enlarged scale details of the mounting structure of the indicator device.

Preferably the shafts 47 are slidably mounted axially in the bores 47' in brackets 49 so that the idler wheels 46 may be slid to one side when the indicator discs 48 are not in use (see Fig. 7).

It is to be understood that the rubber tired wheel and the flanged wheel may be separate and distinct units with respect to construction, diameter, gauge, or position of one wheel axle in relation to the other; the car can also be originally built with rubber tired wheels only but with provision for addition of flanged steel wheels, should the user desire to convert the car to dual ground-rail use. This feature has an economic value to the user.

While we have illustrated and described the preferred embodiments of our invention, it is to be understood that we do not limit ourselves to the precise constructions herein disclosed and the right is reserved to all changes and modifications coming within the scope of the invention as defined in the appended claim.

Having thus described our invention, what we claim as new, and desire to secure by United States Letters Patent is:

A vehicle of the kind described comprising a mine car chassis, front and rear axles mounted on the chassis, a pair of rubber tired wheels mounted on each axle and mechanism supported on the chassis for indicating the inflated condition of the rubber tired wheels, said mechanism including a bracket on the underside of the chassis above each wheel, a shaft journalled in an overside bore in each bracket and disposed parallel to the axis of the adjacent wheel axle, said shaft being shiftable both axially and vertically in said bore, an idler wheel secured to the inner end of the shaft in line with the periphery of the rubber tired wheel in position to be engaged by said periphery and to be frictionally rotated thereby when the rubber tire wheel is properly inflated, and a disc secured to the outer end of said shaft in exposed condition and being rotatable with the idler wheel, said shafts being movable upward in said bores when said rubber tired wheels are over inflated to jam the idler wheel against said chassis, said idler wheels being disposed to lose engagement with said rubber tired wheels when the rubber tired wheels are under inflated.

References Cited in the file of this patent

UNITED STATES PATENTS

| | | |
|---|---|---|
| 793,787 | Heser | July 4, 1905 |
| 2,162,351 | Main | June 13, 1939 |
| 2,219,585 | Begin | Oct. 29, 1940 |
| 2,267,338 | Nugent | Dec. 23, 1941 |
| 2,593,824 | Wilson | Apr. 22, 1952 |

FOREIGN PATENTS

| | | |
|---|---|---|
| 488,970 | Germany | Jan. 11, 1930 |